April 16, 1968   C. SAVIN ET AL   3,377,718
DEVICE AND METHOD FOR DEMONSTRATING THE MEASUREMENT OF ANGLES
Filed Oct. 22, 1965

INVENTORS
CORNELIUS SAVIN
ALAN O. VORWALD
CHRISTOPHER R. VAGTS
BY
R. E. Meech
ATTORNEYS

United States Patent Office 3,377,718
Patented Apr. 16, 1968

3,377,718
DEVICE AND METHOD FOR DEMONSTRATING THE MEASUREMENT OF ANGLES
Cornelius Savin, Westbury, Alan G. Vorwald, Bethpage, and Christopher R. Vagts, Huntington, N.Y., assignors to Antran Corporation, a corporation of New York
Filed Oct. 22, 1965, Ser. No. 500,778
6 Claims. (Cl. 35—34)

ABSTRACT OF THE DISCLOSURE

An animated transparency device and method for demonstrating visually the concepts and measurement of angles and their relation to one another comprising a circular member having markings arranged around the circumferential edge thereof with a pair of rotatable arm-like members pivotally attached thereto at the center thereof, each having a longitudinally extending hairline thereon, one of said rotatable members having at least a pair of holes therein in which a marking instrument is adapted to be inserted for inscribing circles on said circular member, all of said members being made of a transparent material of identifying and contrasting colors adapted to be projected on a screen by an overhead projection.

---

Figure 1:
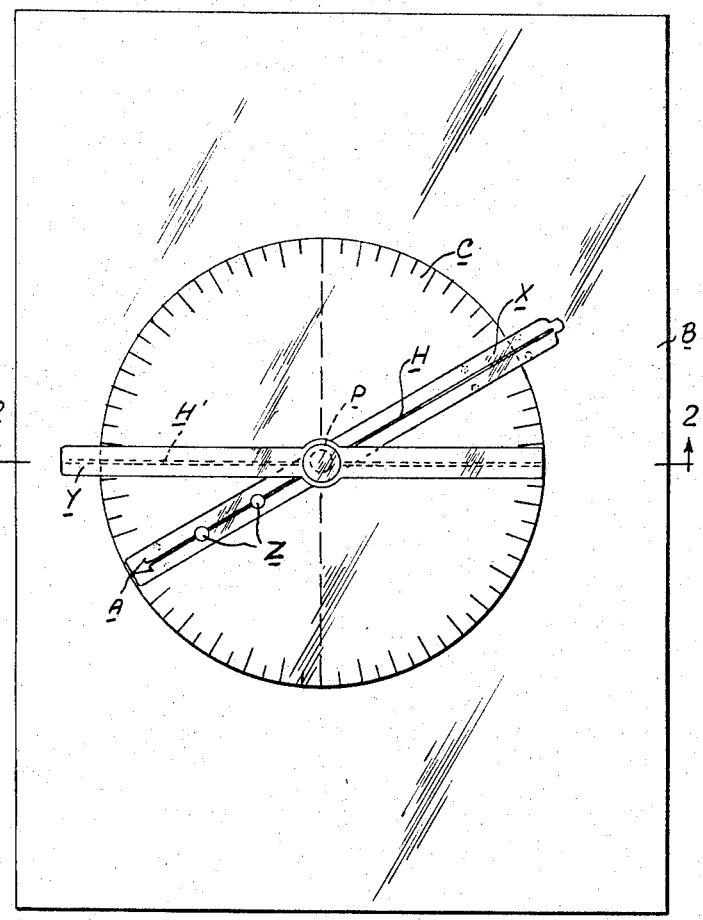

The invention relates to a device for visual presentation to large groups of students at one time by overhead projection of a transparent device, and more particularly, to an animated transparency device for and method of teaching mathematical concepts, especially in geometry, by use thereof.

Oftentimes it is difficult for a student especially if he is lacking in imaginative power to grasp the significance of mere drawn lines and their proposed super-position upon each other especially, for example, where geometric concepts are to be developed in relation to the circle, its characteristics, and measurement. The student's mind can often be helped if such circles, lines, angles, etc. can be represented in a tangible form. In order to overcome this disadvantage, a device is provided, in accordance with the present invention, whereby circles, lines, angles, etc. of various types are represented in concrete form and the parts of the device manipulated in order to illustrate many of the elementary geometrical terms and processes employed in making proofs necessary in this branch of mathematical science.

While various devices and methods have been heretofore suggested and used for teaching or training large groups by means of overhead projection of transparent devices, they were not entirely satisfactory. One such device heretofore suggested employed a so-called "still" transparency. Such "still" transparency devices are merely two-dimensional, while animated transparencies are tri-dimensional which is a decided advantage. Animation imparts a lively and more significant movement to the transparency and is much more easily understood. The modern method of teaching tends toward visualizing, manipulating and direct observation which is a decided advantage of teaching by animated transparencies. The inadequacies of these and other existing teaching means and methods is overcome by the present invention.

It is the general object of the present invention to provide animated teaching devices that overcome the insufficiencies of models, facsimiles, cut-away units and other means that have been previously employed to represent circles, angles, etc. for the purpose of teaching students and others.

It is another object of the invention to provide animated teaching devices of such character that each of the several components or parts of the assembly are readily visible and the relative movements of the related parts are all readily visible and understood. The several parts, or at least some of them, are constructed of transparent materials which are of different colors or shades for ready identification so that even though the parts are superimposed or positioned one within or behind the other, they are all immediately and readily recognizable and their several independent and mutual motions are clearly visible and understood.

It is a further object of this invention to provide a teaching aid of the animated transparency type which may be manipulated or actuated even by the student, himself, to observe the various components perform their respective functions and to solve the particular problem.

It is still another object of the present invention to provide animated transparency devices which are compact, light in weight and conveniently portable so as to facilitate handling, transporting, and storing of the devices.

It is still a further object of the invention to provide teaching devices of this type which are relatively inexpensive in their manufacture and which may be readily duplicated or produced in volume and, at the same time, efficient, effective and instructive in their use.

It is a most important object of the present invention to provide a method of and means for teaching mathematical concepts by the overhead projection of animated transparency devices which visually demonstrates the particular problem to be solved.

It is still a more specific object of this invention to provide a method teaching the geometric concepts of angles and their relation to one another by overhead projection of an animated transparency device wherein a pair of arm-like members are pivotally arranged on the center of a graduated circular member, similar to a circular protractor, and various angles visually illustrated by moving the arm-like members to a number of different positions on the circular member.

Various other objects and advantages of this invention will be more apparent in the course of the following specification, and will be particularly pointed out in the appended claims.

In the accompanying drawings, there is shown for the purpose of illustration, an embodiment which the invention may assume in practice.

Figure 2:
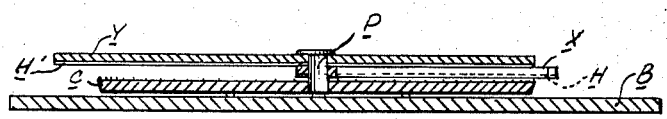
Figure 3:
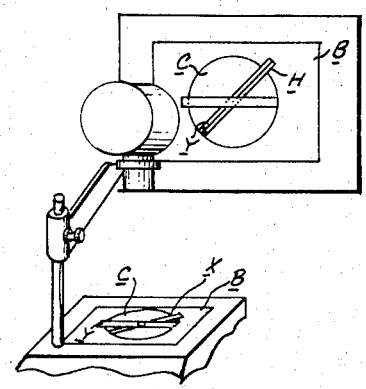

In these drawings:

FIG. 1 is a plan view of the animated transparency device in accordance with the present invention, FIG. 2 is a sectional view taken on line 2—2 of FIG. 1, and FIG. 3 is a perspective view of a portion of an overhead projector and screen used in connection with the visual demonstration of the animated transparency device of the present invention.

Referring more particularly to the drawings, the animated device in accordance with the present invention consists of a clear transparent plastic planar base B, on which there is arranged a circular member C divided in 360 degrees with markings arranged preferably at five degree intervals around the marginal circumferential edge thereof. There is provided a pair of rotatable elongated arm-like members, X and Y, with one disposed on top of the other and pivotally attached centrally thereof to the center of the circular member C, as at P. The lowermost member X preferably has a pair of holes Z arranged therein to one side of its center which member is adapted to serve as a compass and in which holes a marking instrument is adapted to be inserted for inscribing a circle or circles on the circular member. There is arranged centrally of this member X, a longitudinally extending hair-line H which terminates in an arrow A at one end thereof. On the member Y there is also arranged centrally thereof a corresponding longitudinally extending hair-line H'.

Having described the parts and construction of the animated transparency device of the present invention, it functions and is used in the following manner.

The device is positioned on an overhead projector stage with the parts thereof satisfactorily focused on a screen in a well known manner. The rotatable member Y is then set as a base line and the other rotatable member X moved so that the hair-lines H and H' coincide.

The member X is then rotated counter-clockwise through 30 degrees, as shown in the full lines of FIG. 1. The concept is then developed and demonstrated that an angle is a figure formed by the rotation of a directed line and that the size of the angle is related to the amount of rotation.

The member X is then rotated counter-clockwise until the arrow A is returned to the base line. This represents a complete rotation or an arc of 360 degrees which obviously is a full circle, and it should be recognized that the number of degrees in a circle is an arbitrary standard.

The angle formed between a directed line (arm X) and a base line is measured by measuring the arc or the amount of rotation. Thus, one quarter of a complete revolution would be an angle of 90 degrees (¼ of 360 equals 90 degrees).

Use the 90 degree or right angle as a standard to examine and classify other angles: e.g., Acute angles—Those angles less than 90 degrees.
Obtuse angles—Those that are greater than 90 degrees.
Straight angles—Two right angles or 180 degrees.
Reflex angles—Those angles that are greater than two right angles.
Supplementary angles—Two angles whose sum is 180 degrees.
Complementary angles—Two angles whose sum is 90 degrees.

A wide range of vertical angles can be studied and compared to establish the relationship that *vertical angles are equal.*

As a result it will be seen that the animated transparency device in accordance with the present invention can be used to demonstrate visually the measurement of angles and to define and classify them and to ascertain their relation one to another.

While there is shown and described an embodiment which the invention may assume in practice, it will be understood that this embodiment is merely for the purpose of illustration and description, and that other forms can be devised within the scope of the invention as defined in the appended claims.

We claim:

1. An animated tranparency device adapted to be used with an overhead projector for teaching geometry and for illustrating the relation of various angles comprising,
    a transparent circular member divided into 360 degree markings at five degree intervals adapted to be positioned upon the stage of the projector, and
    a pair of elongated rotatable arm-like members with one arranged one above the other and being pivotally attached centrally thereof to the circular member at the center thereof,
    each of said arm-like members having similar longitudinally extending hair-lines arranged thereon,
    said arm-like members adapted to be rotated about their pivotal connection for identifying, measuring and classifying angles and their relation,
    said circular member together with said rotatable members disposed thereon adapted to demonstrate visually a geometric problem by projecting the circular member and rotatable members on a screen by means of the overhead projector.

2. An animated transparency device as defined in claim 1, wherein there is arranged in one of the rotatable members which is adapted to serve as a compass, a pair of holes in which there is adapted to be inserted a marking instrument for inscribing a circle or circles on said circular member.

3. An animated transparency device adapted to be used with an overhead projector for teaching geometry and for illustrating the relation of various angles comprising,
    a transparent planar base adapted to be positioned upon the stage of the projector,
    a transparent circular member arranged on said base divided into 360 degrees, and
    a pair of elongated rotatable arm-like members with one arranged one above the other and being pivotally attached centrally thereof to the circular member at the center thereof,
    each of said arm-like members having similar longitudinally extending hair-lines arranged thereon,
    said arm-like members adapted to be rotated about their pivotal connection for identifying, measuring and classifying angles and their relation,
    said base together with said rotatable members disposed thereon adapted to demonstrate visually a geometric problem by projecting the base and rotatable members on a screen by means of the overhead projector.

4. An animated transparency device as defined in claim 3, wherein there is arranged in one of the rotatable members which is adapted to serve as a compass, a pair of holes in which there is adapted to be inserted a marking instrument for inscribing a circle or circles on said circular member.

5. An animated transparency device adapted to be used with an overhead projector for teaching geometry and for illustrating the relation of various angles, comprising
    a transparent planar base adapted to be positioned upon the stage of the projector,
    a circular protractor mounted on said base having indicia arranged on one face thereof around the circumferential marginal edge portion thereof divided into 360 degrees, and
    a pair of rotatable arm-like members superimposed one on the other and upon said circular member, said arm-like members being pivotally attached centrally thereof to the center of said circular member,
    each of said arm-like members having a hair-line arranged thereon extending centrally substantially throughout the length thereof and passing through the center of said circular member,
    one of said arm-like members having plurality of holes arranged therein and which is adapted to serve as a compass to form a circle or circles on said protractor,
    said circular protractor and arm-like members being of identifying colors and being constructed of a transparent material,
    said base together with said rotatable members disposed thereon adapted to demonstrate visually a geometric problem by projecting the base and rotatable members on a screen by means of the overhead projector.

6. The method of teaching various mathematical concepts by overhead projection by use of an animated transparency device which comprises providing a circular member having markings arranged around the circumferential edge thereof divided into 360 degrees adapted to be positioned upon the stage of a projector, providing a pair of rotatable arm-like members which are pivotally attached to the circular member centrally thereof, positioning the circular member together with the arm-like members arranged thereon on the stage of an overhead projector and projecting the same on a screen so as to demonstrate visually the relationship between various angles formed by said rotatable members relative to said circular member, moving the rotatable members relative to one another and to the circular member so as to form various angles therebetween, and defining, measuring and classifying the angles thus formed in order to ascertain their relation to one another.

References Cited
UNITED STATES PATENTS

| | | | |
|---|---|---|---|
| 774,365 | 11/1904 | Phenix | 33—27 |
| 2,465,481 | 3/1949 | Reiche | 33—98 X |
| 2,841,889 | 7/1958 | Coale et al. | 35—39 |
| 3,128,944 | 4/1964 | Gabriel | 235—61 |

EUGENE R. CAPOZIO, *Primary Examiner.*

W. H. GRIEB, *Examiner.*